Patented Feb. 12, 1935

1,990,908

UNITED STATES PATENT OFFICE 1,990,908

PRODUCTION OF GLYCEROL BY FERMENTATION

William F. Krug, Jr., Wilmington, and Frank A. McDermott, Claymont, Del., assignors to E. I. du Pont de Nemours & Company, Wilmington, Del., a corporation of Delaware No Drawing. Application May 4, 1932,
Serial No. 609,268

6 Claims. (Cl. 195—20)

This invention relates to the production of glycerol by fermentation of sugar solutions and, more particularly, by the fermentation of molasses in the presence of ammonia.

It has been known for some time that good yields of glycerol may be produced by fermenting sugar solutions in the presence of alkaline reacting salts of the alkali metals, sufficient in quantity to give the solution a strongly alkaline reaction. Such process is patented to Eoff, U. S. Patent No. 1,288,398. According to this process, salts of the alkali metals, and particularly soda ash, have been added to the mash in several doses distributed over the first 12-24 hours of the fermentation. The soda ash has been added in as large quantities as possible without permanently stopping the fermentation. While such soda ash process produces a very good yield of glycerol, particularly when special yeasts such as that described as "No. 16" in Patent No. 1,551,997 to F. A. McDermott are used, the addition of the large amounts of soda ash and the like introduces difficult problems in the recovery and purification of the glycerol, particularly when black-strap molasses constitutes the source of the sugar.

For example, a black-strap molasses may have approximately the following composition:

| | Per cent |
|---|---|
| Fermentable sugars | 40–48 |
| Unfermentable sugars | 5– 8 |
| Proteins (N x 6.25) | 4– 5 |
| Gums and organic matters other than sugar, protein, or acids | 15–18 |
| Organic acids (as lactic) | 1–1.5 |
| Ash | 5– 8 |
| Water | 20–22 |

When a molasses of this type, such for instance as one containing 45% of fermentable sugar, 5% of unfermentable sugar and 6% of ash, is diluted with about three times its volume of water and fermented in the presence of sodium carbonate, in accordance with the disclosure of Eoff, in an amount of about 4.5% by weight of the mash or 28% of the weight of total sugar in the mash, each gallon of molasses would yield about 1.25 pounds of glycerol. This glycerol would be admixed with about 0.72 pounds of ash, originally present in the molasses, and about 1.67 pounds of the soda ash added in the process which would give a final ratio of glycerol to ash of about 1:1.91. These ash constituents interfere with the recovery of the glycerol by raising the boiling point of the solution. These salts further tend to accelerate polymerization and decomposition of the glycerol during the distillation thereof, thereby decreasing the yield. This is illustrated in the article by A. C. Langmuir in Ind. & Eng. Chem. of April 1932, pages 378–380 inclusive. These salts further tend to cause decomposition of the non-glycerol organic matter present in the mash producing difficultly removable impurities in the glycerol, which result is favored by the strongly alkaline reaction of the material from which the glycerol must be recovered.

An object of this invention is to provide a new process for the production of glycerol. A further object is to provide such a process which will not have the obvious above-mentioned disadvantages of the prior processes. A still further object is to provide a more economic process for the production of glycerol. Another object is to provide a process of producing glycerol in such a manner that the glycerol may be more readily and completely recovered and purified. Other objects will appear from a consideration of the following description of our invention.

Our invention is based upon our discovery that, by employing a new method of carrying out the fermentation and by differently controlling the alkalinity of the mash, sugar solutions, particularly those made from black-strap molasses, may be fermented to produce high yields of glycerol in the presence of ammonia. Up to the present time, it has been considered by those skilled in the art that free ammonia could not be used in place of soda ash of the Eoff process with the attainment of commercially satisfactory results.

The process forming the subject matter of this invention comprises incubating a suitable yeast in one or more successive steril sugar solutions containing nutrient salts until the yeast has become active and has propagated to the desired extent, when the resulting yeast mash is added to the main mash, which comprises a sugar solution containing nutrient salts, to seed the same. This main mash is then allowed to ferment until the fermentation has become active. It usually takes from 5–8 hours for the mash to reach this stage from the time it was inoculated. When the mash reaches this stage, ammonia is added to the same in sufficient quantity to neutralize the natural acidity of the mash, and render it slightly alkaline. The fermentation is then allowed to proceed until the mash has become approximately neutral or very slightly acidic, whereupon ammonia is again added to restore the reaction of the mash to a slightly alkaline range. This addition of ammonia is repeated as often as is found necessary to maintain the mash slightly on the alkaline side until completion of the fermentation.

While various yeasts may be used in such process, we prefer the yeast described as "No. 16" in the patent to F. A. McDermott, No. 1,551,997, which has been found to be the most efficient for producing glycerol. When we mention "No. 16" yeast in the specification and claims, it is to be understood that we mean the "No. 16" yeast described in Patent 1,551,997. The ammonia, used in accordance with our invention, may be in the form of gas or in aqueous solution. However, for practical reasons, such as ease of handling, control, cheapness, and availability of the reagents we prefer to use commercial ammonium hydroxide solution containing about 26–28% of ammonia.

In order to illustrate our invention and the best mode in which we contemplate carrying the same into effect and to show some of the modifications which may be made in the process, the following examples are given:

*Example 1.*—A laboratory culture of a suitable yeast such as "No. 16" is made in about 200 cc. of a steril nutrient medium containing about 12–15 grams of sugar per 100 cc. This medium may be made from grape juice, malt extract, or molasses with or without the addition of ammonium salts. This culture is incubated at about 30° C. until the fermentation has become active. This active culture is used to inoculate about 2–3 gallons of a steril molasses mash, containing about 15–17 grams of sugar per 100 cc., to which has been added 12–20 grams of ammonium sulfate or equivalent nutrient material. This molasses mash is then incubated at about 30° C. until the fermentation becomes active, which usually requires about 16–30 hours. This active molasses mash is then used to produce a yeast mash by incorporating it in about 180 gallons of an aqueous solution of black-strap molasses of about 24.5–25.5° Brix, containing about 1.42 pounds of sugar per gallon and about 2–4 pounds of ammonium sulfate or equivalent nutrient material. This yeast mash is allowed to ferment at about 30° C. until the fermentation has become active and the Brix has dropped about 2–3°, when about 1.5–2 gallons of 26–28% ammonia water is added to it. Upon the addition of the ammonia water, fermentation ceases for a short time but, in the course of 2–3 hours, becomes active again. About 2–4 hours after the yeast mash has become active and the Brix has dropped about 5–8°, this yeast mash is used to inoculate the main mash. This main mash may consist of 2600 gallons of a solution of black-strap molasses of about 24.5–25.5° Brix, which contains about 1.42 pounds of sugar per gallon and about 5–10 pounds of ammonium sulfate or equivalent nutrient material. The hydrogen-ion concentration of the resulting mash is usually greater than neutrality, generally showing a pH (colorimetric) of about 5.0–5.8. Fermentation of the main mash becomes active in about 3–4 hours after the yeast mash is added. About 3–4 hours later, approximately 18 gallons of 26–28% ammonia-water is added to the main mash. This addition of the ammonia-water moves the reaction to the alkaline side, producing a pH of about 7.2–7.4. Fermentation then ceases for a short time. About 2–3 hours after the fermentation has revived, the pH will be found to have dropped approximately to neutrality or about pH 6.8–7.0. Thereupon, a second portion of about 12 gallons of 26–28% ammonia-water is added, restoring the reaction to the alkaline range. A third similar portion is added about 2 hours after active fermentation is again evident. About 2–3 hours after the fermentation has revived from this third dose, a fourth dose of 6 gallons of the ammonia-water is added. Fermentation is then allowed to go to completion without further treatment, at which time the pH is at about the neutral point, pH 7 or faintly alkaline, pH 7.2–7.3. The total fermentation of the main mash requires about 72–84 hours in all.

After fermentation the mash will contain from about 6.0–6.5% by volume of alcohol and about 2.70–3.15 grams of glycerol per 100 cc. This indicates a yield on the total sugar (3950 pounds) in the molasses of 15.8–18.5% glycerol and 27.9–30.5% alcohol.

The alcohol may be distilled off by any of the usual methods. From about 20–40% of the ammonia used may be recovered in the alcoholic distillation step by the use of any suitable scrubbing device in the alcohol vapor line. The dealcoholized slop is then concentrated in a vacuum evaporator to a heavy syrup, from which the glycerol may be recovered by known methods such as by the use of the spray-tower described by Lawrie in Patent 1,678,150. While such a spray-tower may be used, its use is not necessary for the reason that the relatively low content of the inorganic salts in the concentrated slop renders it possible to satisfactorily recover the glycerol by the use of the more usual type of glycerol distilling equipment. Glycerol may also be recovered from the slop by extraction or dialysis methods, if desired.

During the fermentation, a portion of the sugar is converted to acetic acid, coincidentally with the formation of glycerol; this acid may be recovered at least partially by any of the well known appropriate methods.

*Example 2.*—Sufficient Cuban black-strap molasses was dissolved in water to give a solution containing substantially 16 grams of total reducing sugars calculated as invert sugar in 100 cc. of solution. This solution was divided into three portions of (a) 210 cc. (b) 1890 cc. and (c) 18900 cc. These three solutions were sterilized and 1 gram of diammmonium phosphate as nutrient material was added to (a), 5 grams to (b), and 15 grams of ammonium sulfate were added to (c).

After cooling solution (a) to 30° C., it was inoculated with 20 cc. of active culture of "No. 16" yeast in a malt extract medium and incubated at 30° C. for 24 hours. After incubation, solution (a) was added to (b) and the mixture incubated at 30° C. Thirteen hours after mixing solutions (a) and (b), anhydrous sodium carbonate to the amount of 21 grams was added. The mixture of these two solutions was incubated at 30° C. for 5 hours more, at the end of which time they were transferred to solution (c) and the mixture incubated at 30° C. After this last mixture had incubated for about 5 hours, 140 cc. of 26% solution of ammonia were added and stirred in thoroughly. This addition of ammonia changed the pH of the solution from 5.8–7.2. After the addition of the ammonia, the fermentation ceased but became active again in 2 hours. A second dose of 140 cc. of a 26% solution of ammonia was added to the solution 2 hours after fermentation had become active, changing the pH from 6.6–7.3. Three hours later a third dose of 140 cc. of a 26% solution of ammonia was added, changing the pH from 7–7.7. Fermentation was then allowed to go to completion at a temperature of 30° C. The fermentation was complete 78 hours after the mixture of solutions (a) and (b) had been added to solution (c).

The resultant beer contained 4.13% by volume of ethyl alcohol and 2.93 grams per 100 cc. of glycerol. The initial sugar was consumed to the extent of 92.16%, with 18.24% being converted to glycerol.

*Example 3.*—Javan cane molasses containing about 55% total sugar calculated as invert was dissolved in sufficient water to give a solution containing about 18 grams of sugar per 100 cc. This solution was divided into two portions of 300 cc. and 2700 cc. respectively. One gram of ammonium sulfate was added to the 300 cc. portion and 2.5 grams were added to the 2700 cc. portion as nutrient material, after which, the two portions were sterilized in flasks. The 300 cc. solution was then inoculated with a few cc. of a culture of "No. 16" yeast and incubated at 30° C. for 28 hours. At the end of this time, the incubated solution was stirred into the 2700 cc. solution to seed the same and the mixture incubated at 30° C. Ammonia-water containing 28% $NH_3$ was added to the mixture as follows:

| Dose | Vol. cc. | Hours after seeding |
|---|---|---|
| 1 | 20 | 5:10 |
| 2 | 15 | 10:55 |
| 3 | 10 | 14:05 |
| 4 | 5 | 16:40 |

At the completion of the fermentation, the solution had a pH of 7.0 and contained 7.29% of ethyl alcohol by volume and 2.38 grams of glycerol per 100 cc. The sugar consumption was 90.09% yielding 34.34% of alcohol and 14.18% of glycerol, based on the total initial sugar.

*Example 4.*—Cuban black-strap molasses was dissolved in sufficient water to give a solution containing about 17 grams of total sugar, calculated as invert, for each 100 cc. of solution. This solution was divided into two portions of (a) 200 cc. and (b) 2800 cc. to which were added 1 and 2.5 grams of ammonium sulfate, respectively. The solutions were then sterilized separately and cooled to about 30° C. Solution (a) was then inoculated with 10 cc. of an active culture of "No. 16" yeast in a molasses solution, about 24 hours old, and incubated at 30° C. for 24 hours. Solution (a) was then admixed with (b). Before admixing the two solutions, 10 cc. of a 26% solution of ammonia was added to solution (b) to change the pH from 5.6 to about 7.0. The addition of the solution (a) reduces this pH value to 6.8. Three subsequent additions of 10 cc., 18 cc., and 15 cc., respectively, of 26% ammonia-water were added successively, at various times, during the fermentation after the fermentation became active in accordance with the principles heretofore given. The fermentation was complete in 84 hours, yielding 32.83% of the initial sugar as alcohol and 14.57% as glycerol.

While we have specifically described the fermentation of back-strap molasses in the above examples, it is understood that other sugar containing solutions may be substituted therefor. Also, other yeasts, which will produce glycerol in alkaline sugar solutions, may be substituted for the yeast specifically mentioned.

It is also apparent that the number of doses of ammonia and the times of adding the same as well as the quantities thereof which are added, during the fermentation, will vary within rather wide limits, depending upon the character of the solution and of the yeast and the conditions under which the fermentation takes place.

Instead of the ammonia-water employed, equivalent quantities of gaseous ammonia may be used without departing from our invention. Accordingly, the term "ammonia" as used in the appended claims will be understood to include $NH_3$, either gaseous or in solution.

From a consideration of the above examples, it will be apparent that we have discovered a process whereby glycerol may be produced by fermentation of a sugar solution in the presence of ammonia. By the use of ammonia, the disadvantages, arising from the large amounts of salts added in the soda ash process, are eliminated. For example, if a molasses, containing 45% of fermentable sugar, 5% of non-fermentable sugar and 6% ash, was diluted by three times its volume of water and fermented in accordance with our invention, there would be obtained about 18–20% of the fermentable sugars as glycerol or 0.975–1.08 pounds per gallon of molasses in the presence of only the inorganic salts ordinarily present in the molasses so that the ratio of glycerol to ash would be only about 1.0–0.7. This represents a reduction of the ash with respect to the glycerol to about 40% of that which would be obtained with the soda ash process. Accordingly, the recovery of the glycerol from this small amount of ash would be comparatively simple, the boiling point of the glycerol would not be objectionably raised, and the tendency for the formation of polymerization and decomposition products would be greatly decreased. Simpler and cheaper equipment may be used for recovering the glycerol with the obtention of a purer product than is possible with the soda ash process.

Besides the many advantages entailed in the handling of ammonia over that of handling strong caustics such as sodium and potassium hydroxides and carbonates, we have found that the amount of ammonia-water, which it has been found to be necessary to add, is of such volume that a real economy in cost of operation is obtained, rendering the process commercially more feasible and profitable than the soda ash process and other known processes.

While the examples recite specific quantities, proportions and concentrations of ingredients and the addition of the ammonia in a specific number of doses, ratios, and proportions, it will be apparent to those skilled in the art that these factors are subject to considerable variation within the spirit of our invention. Accordingly, the scope of our invention is to be limited solely by the appended claims construed as broadly as is permissible in view of the prior art.

We claim:

1. The process of producing glycerol which comprises fermenting a solution of yeast fermentable sugar by means of yeast to produce glycerol, maintaining the pH value of the solution between approximately 7 to about 8 during the major part of the fermentation by the addition of ammonia thereto at such times and in such amounts as to maintain said pH value during said major part of the fermentation and until the completion of the fermentation, whereby the amounts of fixed salts in the fermented solution is not substantially increased over the amount originally present in the sugar solution.

2. The process of producing glycerol which comprises fermenting a solution of yeast fermentable sugar by means of No. 16 yeast to produce glycerol, maintaining the pH value of the solution between approximately 7 to about 8 during the major part of the fermentation by the addition of ammonia thereto at such times and in such amounts as to maintain said pH valve during said major part of the fermentation and until the completion of the fermentation, whereby the amounts of fixed salts in the fermented solution is not substantially increased over the amount originally present in the sugar solution.

3. The process of producing glycerol which comprises fermenting a solution of yeast fermentable sugar by means of yeast to produce glycerol, maintaining the pH value of the solution between approximately 7 to about 8 during the major part of the fermentation by the addition of an aqueous solution of ammonia thereto at such times and in such amounts as to maintain said pH value during said major part of the fermentation and until the completion of the fermentation, whereby the amounts of fixed salts in the fermented solution is not substantially increased over the amount originally present in the sugar solution.

4. The process of producing glycerol which comprises fermenting a solution of yeast fermentable sugar by means of No. 16 yeast to produce glycerol, maintaining the pH value of the solution between approximately 7 to about 8 during the major part of the fermentation by the addition of an aqueous solution of ammonia thereto at such times and in such amounts as to maintain said pH value during said major part of the fermentation and until the completion of the fermentation, whereby the amounts of fixed salts in the fermented solution is not substantially increased over the amount originally present in the sugar solution.

5. The process of producing glycerol which comprises fermenting a solution of yeast fermentable sugar by means of yeast to produce glycerol, maintaining the pH value of the solution between approximately 7 to about 8 during the major part of the fermentation by the addition of ammonia thereto at such times and in such amounts as to maintain said pH value during said major part of the fermentation and until the completion of the fermentation, the ammonia being added to the solution only during active fermentation thereof by the yeast, whereby the amounts of fixed salts in the fermented solution is not substantially increased over the amount originally present in the sugar solution.

6. The process of producing glycerol which comprises fermenting a solution of yeast fermentable sugar by means of No. 16 yeast to produce glycerol, maintaining the pH value of the solution between approximately 7 to about 8 during the major part of the fermentation by the addition of ammonia thereto at such times and in such amounts as to maintain said pH value during said major part of the fermentation and until the completion of the fermentation, the ammonia being added to the solution only during active fermentation thereof by the yeast, whereby the amounts of fixed salts in the fermented solution is not substantially increased over the amount originally present in the sugar solution.

WILLIAM F. KRUG, Jr.
FRANK A. McDERMOTT.